United States Patent
Kapadia et al.

(10) Patent No.: US 10,880,248 B2
(45) Date of Patent: Dec. 29, 2020

(54) ORCHESTRATOR AGNOSTIC APPLICATION CONTAINER VISIBILITY

(71) Applicant: Cisco Technology, Inc., San Jose, CA (US)

(72) Inventors: Shyam Kapadia, San Jose, CA (US); Viral Barot, San Jose, CA (US); Abhinandan Prativadi Bayankaram, Fremont, CA (US); Naoshad Mehta, San Jose, CA (US); Nilesh Shah, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 172 days.

(21) Appl. No.: 15/614,743

(22) Filed: Jun. 6, 2017

(65) Prior Publication Data

US 2018/0349033 A1  Dec. 6, 2018

(51) Int. Cl.
*H04L 12/58* (2006.01)
*G06F 9/455* (2018.01)
*G06F 9/46* (2006.01)

(52) U.S. Cl.
CPC .......... *H04L 51/12* (2013.01); *G06F 9/45558* (2013.01); *G06F 9/46* (2013.01); *G06F 2009/45595* (2013.01)

(58) Field of Classification Search
CPC .... G06F 21/554; G06F 11/30; G06F 11/3006; G06F 11/3051; G06F 8/65; G06F 9/44505; G06F 9/50; G06F 9/45558; G06F 9/45533; G06F 2009/4557; G06F 9/542; H04L 63/102; H04L 67/10; H04L 41/12; H04L 49/70; H04L 67/1042; H04L 67/34; H04L 41/085; H04L 43/08; H04L 47/783; H04L 41/08; H04L 41/0806; H04L 41/0886; H04L 47/70; H04L 47/78; H04L 43/0817; H04L 63/1433; H04L 67/30
USPC ........................................... 307/9.1; 709/224
See application file for complete search history.

(56) References Cited

U.S. PATENT DOCUMENTS

| 9,462,427 | B2 |  | 10/2016 | Patel et al. | |
|---|---|---|---|---|---|
| 10,212,041 | B1 | * | 2/2019 | Rastogi | H04L 41/12 |
| 10,552,586 | B1 | * | 2/2020 | Duan | G06F 9/45533 |
| 2003/0028682 | A1 | * | 2/2003 | Sutherland | G06F 9/4493 719/315 |
| 2012/0203890 | A1 | * | 8/2012 | Reynolds | G06F 11/3495 709/224 |

(Continued)

OTHER PUBLICATIONS

Alan; Configurable Docker Containers for Multiple Environments; Mar. 26, 2015; pp. 1-11 (Year: 2015).*

(Continued)

*Primary Examiner* — Backhean Tiv
*Assistant Examiner* — Linh T. Nguyen
(74) *Attorney, Agent, or Firm* — Edell, Shapiro & Finnan, LLC

(57) ABSTRACT

A network device is configured to establish a messaging bus with a container networking plug-in, which is associated with a container virtual network. The network device is also configured to obtain, via the messaging bus, networking information for one or more containers hosted at the at least one container-hosting computing device. Based on the networking information, the network device provides visibility of one or more containers below the network device.

20 Claims, 4 Drawing Sheets

(56) References Cited

U.S. PATENT DOCUMENTS

| | | | | |
|---|---|---|---|---|
| 2012/0222037 | A1* | 8/2012 | Labat | G06F 9/5072 718/104 |
| 2013/0007847 | A1* | 1/2013 | Plattner | G06Q 10/08 726/4 |
| 2014/0201374 | A1 | 7/2014 | Ashwood-Smith et al. | |
| 2014/0317261 | A1* | 10/2014 | Shatzkamer | H04L 12/24 709/223 |
| 2015/0263983 | A1 | 9/2015 | Brennan et al. | |
| 2016/0127254 | A1* | 5/2016 | Kumar | H04L 47/70 709/226 |
| 2016/0335017 | A1* | 11/2016 | Behera | G06F 9/455 |
| 2016/0366233 | A1* | 12/2016 | Le | H04L 67/16 |
| 2017/0142203 | A1* | 5/2017 | Zhang | G06F 8/60 |
| 2017/0214550 | A1* | 7/2017 | Kumar | H04L 41/0654 |
| 2017/0359223 | A1* | 12/2017 | Hsu | H04L 41/12 |
| 2018/0091449 | A1* | 3/2018 | Tellez | H04L 5/14 |
| 2018/0167354 | A1* | 6/2018 | Lafragette | H04L 61/1582 |
| 2018/0287903 | A1* | 10/2018 | Joshi | H04L 67/10 |
| 2018/0336351 | A1* | 11/2018 | Jeffries | G06F 21/53 |

OTHER PUBLICATIONS

Wahner; Relation of Middleware to Microservices, Docker, and Cloud Native Architecture; Jun. 10, 2016; DZone, pp. 1-17 (Year: 2016).*

Glider Labs; Docker Events Explained; Apr. 14, 2015; Glider Labs; pp. 1-3 (Year: 2015).*

Docker Inc., "Docker Swarm", https://docs.docker.com/swarm/, downloaded Jul. 22, 2019, 1 page.

Fawad Khaliq, "Docker Networking in Swarm, Mesos and Kubernetes", https://www.slideshare.net/PLUMgrid/docker-networking-with-container-orchestration-engines-docker-meetup-santa-clara-april-2016-60944259, Apr. 2016, 25 pages.

Docker Inc., "Network Overview", downloaded Jul. 22, 2019, https://docs.docker.com/network/, 3 pages.

"Arista Container Tracer", Solution Brief, arista.com, Jan. 2016, 3 pages.

* cited by examiner

| CONTAINER NAME | PORT | NETWORK | SEGMENT |
|---|---|---|---|
| C1 | E1/1 | 100 | 80001 |
| C9 | E1/10 | 145 | 80002 |
| C15 | E1/15 | 160 | 80003 |

ORCHESTRATOR AGNOSTIC APPLICATION CONTAINER VISIBILITY

TECHNICAL FIELD

The present disclosure relates to the use of application containers.

BACKGROUND

The microservice architecture (microservices) refers to a computing architectural style in which software applications are deployed as modular services that each run a unique process to perform a discrete business function. The modular services are independent from one another and communicate through a lightweight mechanism, such as Application Program Interfaces (APIs). The microservice architecture is highly scalable and has revolutionized the way applications are being developed and deployed. For example, the microservice architecture enables the continuous delivery/deployment/integration of large, complex applications and enables an enterprise/organization to evolve its technology stack.

A software/application container ("container") is a type of operating system level (OS-level) virtualization technique that allows an application and its dependencies to run as resource-isolated processes. That is, a container is a lightweight, stand-alone, executable package of a piece of software that includes everything needed to run the software, including code, runtime, system tools, system libraries, settings, etc. bundled into one package. Unlike virtual machines (VM), containers have no need for embedded operating systems and calls are made for operating system resources via an API.

Containers and the microservices architecture are distinct from one another, where a microservice may run in a container, but a container need not be used for a microservice. However, containers have lightweight and portability properties which make them well suited for deploying microservices. For example, container-based micro-services are being widely adopted in the Data Center/Cloud Industry where, rather than building a single large, monolithic application, the container-based micro-services split the application into a set of smaller interconnected services.

BRIEF DESCRIPTION OF THE DRAWINGS

FIG. 2 is a table illustrating networking information obtained from notifications received/pulled from a container network manager, according to an example embodiment.

DESCRIPTION OF EXAMPLE EMBODIMENTS

Overview

Briefly, aspects presented herein are generally directed to enabling container networking functionality at a network device that is connected to at least one container-hosting computing device. The network device is configured to establish a messaging bus with a container networking plug-in, which is associated with a container virtual network. The network device is also configured to obtain, via the messaging bus, networking information for one or more containers hosted at the at least one container-hosting computing device. Based on the networking information, the network device provides visibility of one or more containers below the network device.

Example Embodiments

The microservices architecture has revolutionized the way applications are being developed and deployed and there has been a surge in the interest in the use of containers. In general, most of the interest has focused around building container orchestration stacks that revolve around compute and storage (volumes), while networking aspects have largely been ignored. However, given the dynamic nature of container workloads, the use of containers calls for the underlying network (e.g., network devices to which the container-hosting computing devices are connected), to be programmable, agile, automated, and debuggable. Also, with availability and adaptation of various Container Orchestration Engines (COEs), it becomes important that the network provides seamless programmability, agnostic of the Container Orchestration Engines.

Figure 1:
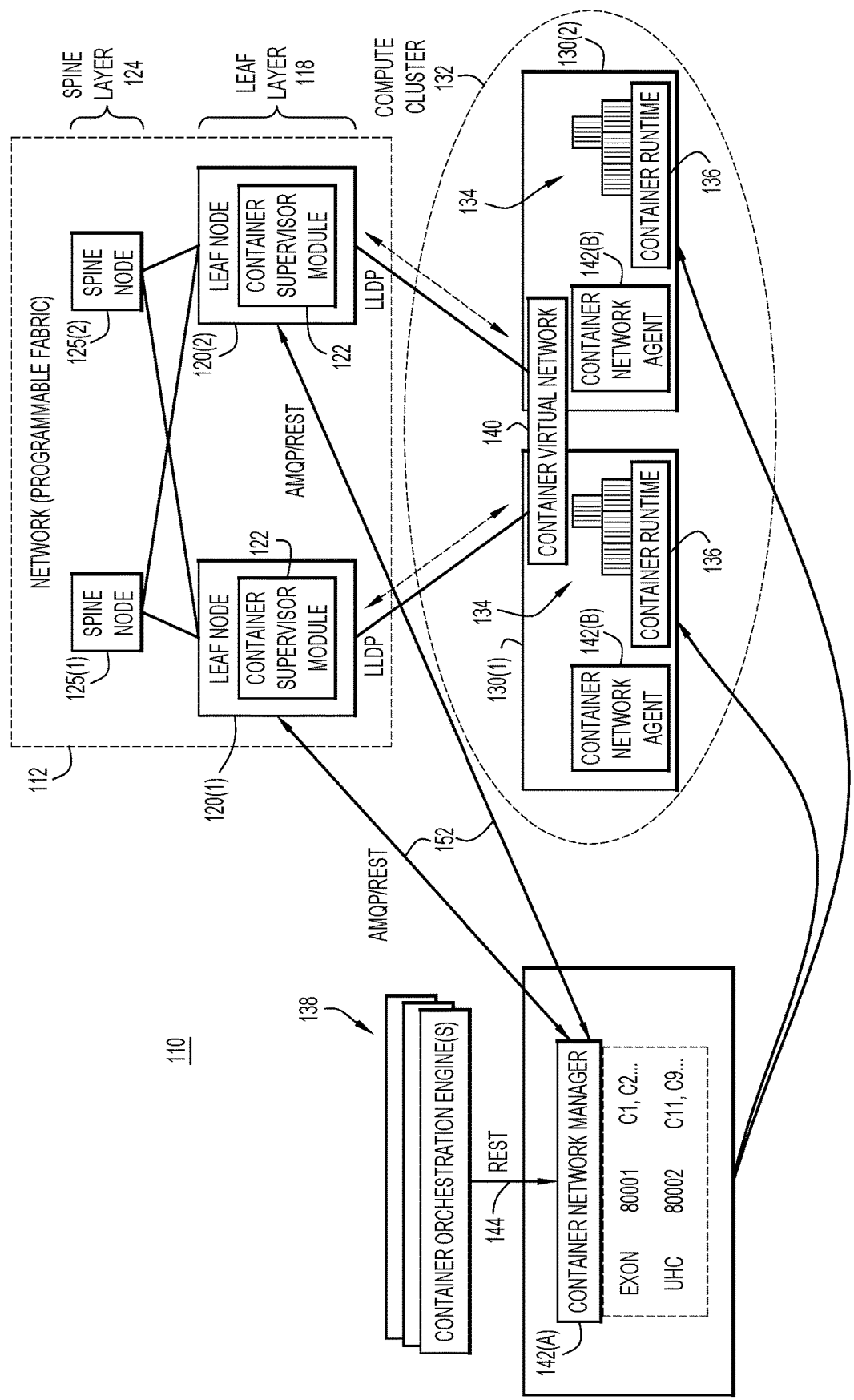
FIG. 1 is a diagram illustrating a network environment configured to implement the techniques presented herein, according to an example embodiment.

Referring first to FIG. 1, shown is a schematic diagram illustrating a network environment 110 in which techniques in accordance with examples presented herein may be implemented. The network environment 110 includes a network (e.g. programmable fabric) 112 formed by a set of interconnected network devices/nodes (e.g., switches) in a leaf and spine architecture (e.g., CLOS network topology). More specifically, the network 112 comprises a leaf layer 118 comprised of leaf nodes (e.g., leaf switches) 120(1) and 120(2), and a spine layer 124 comprises of spine nodes (e.g., spine switches) 125(1) and 125(2). In the example of FIG. 1, the leaf nodes 120(1) and 120(2) each include a container supervisor module 122 configured to implement the techniques presented herein.

In general, a leaf and spine architecture, such as that shown in FIG. 1, creates a low-latency, scalable programmable fabric. However, it is to be appreciated that the leaf and spine architecture of FIG. 1 is merely an example of a network architecture in which the techniques described herein may be implemented. It is also to be appreciated that the specific arrangement of FIG. 1 that includes two spine nodes and two leaf nodes is also illustrative and that other arrangements in accordance with examples presented herein may include different numbers of spine nodes, leaf nodes, and/or other devices.

In FIG. 1, a plurality of container-hosting computing devices are connected to the network 112. More specifically, computing devices 130(1) and 130(2) are connected to the leaf switches 120(1) and 120(2), respectively. In accordance with examples presented herein, the computing devices 130(1) and 130(2) are physical endpoints (e.g., servers) that collectively form a compute cluster 132. For ease of description, the computing devices 130(1) and 130(2) are referred to herein as servers 130(1) and 130(2).

The servers 130(1) and 130(2) are configured to host one or more software/application containers ("container") 134 and a container runtime 136. As noted above, each of the application containers 134 are stand-alone executable software packages that include everything needed to run the software package, including code, runtime, system tools, system libraries, settings, etc. bundled into the package. A container runtime 136 is a basic container software layer that is configured to, among other container lifecycle events, spawn, start, stop, delete, etc. containers on/at the respective server.

FIG. 1 also illustrates the use of a plurality of different types of Container Orchestration Engines (COEs) 138, and a container virtual network 140. The network environment 110 also includes a container networking plug-in, which is configured to deliver policy-based management of the container virtual network 140. That is, the container networking plug-in is a layer that handles the container networking for the servers 130(1) and 130(2) and which is formed by several primary components, namely a container network manager (master) 142(A) and container network agents 142(B). The container network manager 142(A) runs on a computing device 145 and is in communication with the Container Orchestration Engines 138 via, for example, one or more Representational state transfer (REST) interfaces 144. The container network agents 142(B) run on the servers 130(1) and 130(2) in the compute cluster 132. The container network manager 142(A) and the container network agents 142(B) are collectively and generally referred to herein as the "container networking plug-in" 142.

A container networking plug-in, such as container networking plug-in 142, provides a high level of networking abstraction for the containers 134 and the container virtual network 140. That is, the container networking plug-in 142 defines the networking attributes associated with the containers 134 and, accordingly, defines the parameters of the container virtual network 140. For example, the container networking plug-in 142 may define: the Internet Protocol (IP) address allocation for containers 134 (i.e., define the IP address management scheme); whether containers 134 will be associated with virtualized Network Interface Cards (vNICs), virtual switches, etc.; whether containers 134 will send an IP-based packet, Virtual Extensible LAN (VXLAN) packet, or other overlay packet; whether layer (L3) routing done on the host; and/or other networking parameters. The container networking plug-in 142 may be configured to operate with different kinds of networks, such as pure layer 3 (L3) networks, overlay networks, and layer 2 (L2) networks, and may provide the same virtual network view to containers regardless of the underlying network topology.

As noted, FIG. 1 illustrates the present of a plurality of different types of Container Orchestration Engines 138 (e.g., Docker, Kubernetes, Mesos, etc.). The Container Orchestration Engines 138 operate with the container networking plug-in 142 to instantiate and manage the containers 134 in the compute cluster 132. The Container Orchestration Engines 138 allocates appropriate compute resources to the containers, while the container networking plug-in 142 provides networking to the containers 134. The container networking plug-in 142 supports both the container network model (e.g., Docker networking Architecture) and Container Network Interface (e.g., CoreOS, the Kubernetes networking architecture) and has L2, L3 (e.g., BGP), Overlay (e.g., VXLAN), and Application Centric Infrastructure (ACI) modes.

As noted, the container networking plug-in 142 is formed by the container network manager 142(A) and container network agents 142(B). The container network manager 142(A) is a central entity that acts as resource manager which does resource allocation of IP addresses, VLAN and VXLAN IDs for networks, learns routes, for the compute cluster 132 (i.e., operates as a central entity that manages the entire cluster). The container network manager 142(A) distributes information to the container network agents 142(B). In one example, the container network manager 142(A) is a REST Application Programming Interface (API) server that can handle multiple requests simultaneously.

Each container network agent 142(B) implements a Container Network Interface (CNI) networking model or a Container Network Model (CNM) adopted by popular Container Orchestration Engines to perform local programming (i.e., program the respective server 130(1) or 130(2)). Each container network agent 142(B) also communicates with the container network manager 142(A) via, for example, a REST Interface or a RPC interface.

Different types of Container Orchestration Engines (e.g., Docker, Kubernetes, Mesos, etc.) each have different mechanisms for instantiating and managing containers. Network devices may operate with container-hosting servers that are managed by different Container Orchestration Engines. In conventional such arrangements, the network devices can interoperate with (i.e., directly communicate with, decode information from, etc.) all of the different types of Container Orchestration Engines. Interoperability with each different type of Container Orchestration Engine increases the overhead at each network device and makes the network devices difficult to extend, manage, and maintain over time. Moreover, as the scale of the containerization increases within a specific network, the number of notifications that an individual network device has to process will eventual overwhelm the capacity of the device (i.e., all the filtering happens at the receiving end (the switch), which inherently limits containerization scalability).

To address these and other issues, the techniques presented herein configure network devices, such as leaf nodes 120(2), to support container visibility in a way that is agnostic to which type of Container Orchestration Engine is in use. More specifically, as noted above, the leaf nodes 120(1) and 120(2) include container supervisor modules 122. The container supervisor modules 122 are configured to subscribe to and monitor container lifecycle notifications/events generated by the container network manager 142(A). Since the container network manager 142(A) is aware of the networking information for the containers 134, the container supervisor modules 122 can obtain the container networking information (i.e., the information needed to implement container virtual network 140) via these container lifecycle notifications, rather than from the Container Orchestration Engines. As a result, the leaf nodes 120(1) and 120(2) are "Orchestration Engine agnostic," meaning the leaf nodes 120(1) and 120(2) can support any of the different types of Container Orchestration Engines without a specific requirement that the leaf nodes 120(1) and 120(2) be configured to be separately interoperable with each of the different types of Container Orchestration Engines. Stated differently, the leaf nodes 120(1) and 120(2) are Orchestration Engine agnostic due to fact that the leaf nodes interact with the container network manager 142(A), which in turn hides the orchestrator specifics from the leaf nodes.

As noted above, the container network manager 142(A) is configured to, among other services, perform IP address management of containers 134, provide per tenant Domain Name System (DNS) services, etc. Therefore, the container network manager 142(A) is able to detect the occurrence of any container lifecycle events associated with the containers 134. These container lifecycle events may include, for example, when a container is spawned, started, stopped, deleted, etc. When the container network manager 142(A) detects a container lifecycle event, the container network manager 142(A) is configured to announce/publish container lifecycle notifications (e.g., Advanced Message Queuing Protocol (AMQP) notifications, REST notifications, etc.), which are represented in FIG. 1 by arrows 152.

The container supervisor modules 122 running on the leaf nodes 120(1) and 120(2) are configured to subscribe to these container lifecycle notifications 152 to thereby create messaging queues/buses between the container network manager 142(A) and each of the leaf nodes 120(1) and 120(2). When a container supervisor module 122 receives a container lifecycle notification 152, the container supervisor module is configured to extract the container networking information therefrom. In other words, each of the container supervisor modules 122 establishes, with the container network manager 142(A), a messaging bus by which the respective container supervisor modules 122, and accordingly, the leaf node, can obtain networking information related to the containers, yet remain unaware of the underlying Container Orchestration Engines.

In general, the leaf nodes 120(1) and 120(2) are initially configured with the IP address and credentials of the container network manager 142(A) and configured to use this information to establish the subscription to the container lifecycle notifications 152. The first time that a leaf node 120(1) or 120(2) connects to the container network manager 142(A), the leaf node receives all of the networking information regarding the containers connected below the respective leaf node. Subsequently, the leaf node can receive only incremental networking information (e.g., networking changes) for those or new containers connected below the leaf node.

Using the information extracted from the container lifecycle notifications 152, the leaf nodes 120(1) and 120(2) operate to perform one or more operations. In particular, using the networking information extracted from the container lifecycle notifications 152, the leaf nodes 120(1) and 120(2) provide visibility of one or more containers below the network device (i.e., below the respective the leaf node 120(1) or 120(2)). In other words, the leaf nodes 120(1) and 120(2) can indicate what containers are running behind which switch and respectively which port. This is true even when the switch is just a pass-through (e.g., in case the compute-node to compute-node communication uses VXLAN or some other tunnel). In addition, the using the networking information extracted from the container lifecycle notifications 152, the leaf nodes 120(1) and 120(2) may configure networking functionality for containers 134 on the container virtual network 140. That is, the leaf nodes 120(1) and 120(2) store and subsequently utilize the networking information for containers 134 so that network traffic can be forwarded to/from the containers 134 over the container virtual network 140. For example, if a leaf node 120(1) or 120(2) is not a pass through, the node may be required to obtain some VLAN/SVI or network resource that is configured dynamically to aid in switching the traffic to/from containers then the events of the containers like start/stop etc. This functionality can be dynamically triggered based on the container lifecycle notifications 152 to ensure that resources are provisioned/de-provisioned thereby ensuring optimal usage of resources without any manual intervention.

As used herein, the networking information for a container is the networking information generally needed to forward packets to/from the container. FIG. 2 is a table 155 illustrating example networking information for several containers 134, where the networking information includes container name or identifier, switch port information (port), Network/Sub-network (e.g., VLAN), and segment. This information is merely illustrative and the networking information for a container may also include additional or other information, such as an associated IP address, Media Access Control (MAC) address, Tenant, Application, Image, etc. As noted above, the networking information for a container is generally extracted from the container lifecycle notifications 152.

In certain examples, the container supervisor modules 122 are configured to only subscribe to container lifecycle notifications 152 that are related to containers 134 connected below the associated leaf nodes 120(1) and 120(2). That is, as noted above, the leaf nodes 120(1) and 120(2) are connected to servers 130(1) and 130(2), respectively, that each host one or more containers. As such, the servers 130(1) and 130(2) are sometimes are also referred to herein as "container-hosting computing devices." Using a discovery mechanism, such as the Link Layer Discovery Protocol (LLDP) for dynamic discovery of server to switch port mapping, the container supervisor modules 122 can determine which container-hosting computing devices are connected below the associated leaf node and, in certain examples, determine what containers are hosted below the associated leaf node. Once the container supervisor modules 122 are aware of the servers and/or containers connected below the associated leaf node 120(1) or 120(2), the container supervisor modules 122 can inform the container network manager 142(A) that only notifications related to those servers/containers are to be provided to the associated leaf node 120(1) or 120(2). Stated differently, the container supervisor modules 122 can be configured so as to only subscribe to container lifecycle notifications 152 that relate to servers and/or containers connected to (below) the associated leaf node 120(1) or 120(2).

In alternative examples, the container supervisor modules 122 are configured to filter container lifecycle notifications 152 based on network device connectivity determined, for example, using LLDP-based topology discovery. That is, the container supervisor modules 122 may receive container lifecycle notifications 152 for containers 134 connected below the respective leaf node 120(1) or 120(2), as well as for containers 134 that are not connected below the respective leaf node. In these examples, the container supervisor modules 122 are aware of the servers and/or containers connected below the associated leaf node 120(1) or 120(2), and the container supervisor modules 122 can process only container lifecycle notifications 152 that are related to the servers and/or containers connected below the associated leaf node.

In certain examples, there may be some provisioning needed on the leaf nodes 120(1) and/or 120(2) to ensure that containers 134 on the different servers 130(1) and 130(2) can communicate with one another. As such, there may be some configuring of network policies on the leaf nodes 120(1) and/or 120(2) which, in accordance with examples presented herein, can be triggered based on the container lifecycle notifications 152 that are sent to the container supervisor modules 122 (i.e., the container lifecycle notifications 152 can also be used to trigger dynamic/automatic provisioning of overlay networks and networking policies on the appropriate leaf nodes). The container network manager notifications 152 could trigger the leaf nodes 120(1) and/or 120(2) to configure any of a number of different network policies, such as the creation of virtual local area networks (VLANs), access control lists (ACLs), or any other network policy that facilitates container to container communication.

Figure 3:
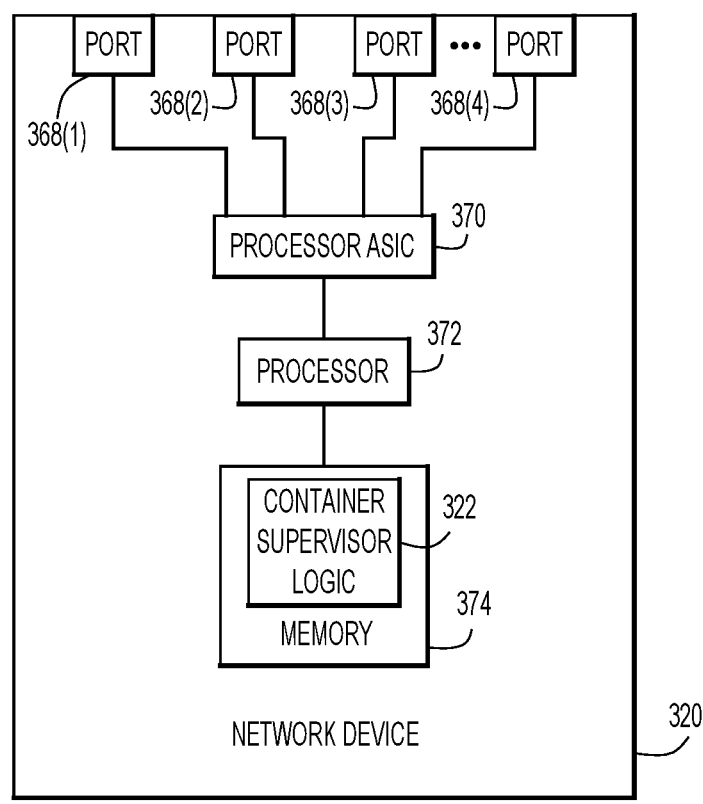
FIG. 3 is a block diagram of a network device, according to an example embodiment.

FIG. 3 is a block diagram of a network device 320 (e.g., leaf node/switch) that is configured to implement the techniques presented herein. The network device 320 includes a network interface unit in the form of a plurality of network ports 368(1)-368(N) that enable communications over a network, a processor Application Specific Integrated Circuit (ASIC) 370 that performs network processing functions, one or more processors 372 (e.g., microprocessors or microcontrollers), and a memory 374. The memory 374 stores, among other elements, container supervisor logic 322. It is to be understood that, in certain examples, the network device 320 may be a virtual (software-based) appliance.

The memory 374 may include read only memory (ROM), random access memory (RAM), magnetic disk storage media devices, optical storage media devices, flash memory devices, electrical, optical, or other physical/tangible memory storage devices. Thus, in general, the memory 374 may comprise one or more tangible (non-transitory) computer readable storage media (e.g., a memory device) encoded with software comprising computer executable instructions and when the software is executed (by the one or more processors 372) it is operable to perform the operations described herein with reference to a leaf node. In particular, as noted, the memory 374 includes container supervisor logic 322 that, when executed, enables the network device 320 to perform the operations described above with reference to a container supervisor module.

Figure 4:
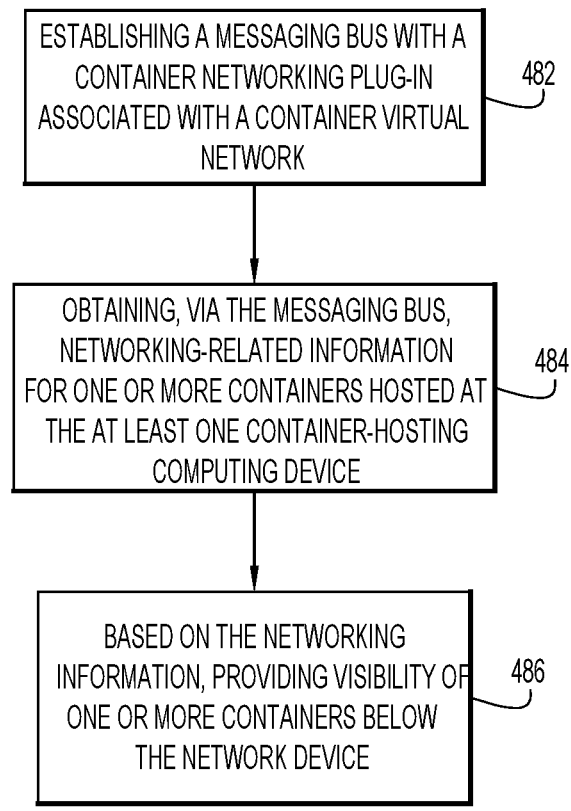
FIG. 4 is a flowchart illustrating a method, according to an example embodiment.

FIG. 4 is a flowchart of a method 480 in accordance with examples presented herein that is performed at a network device that is connected to at least one container-hosting computing device. Method 480 begins at 482 where the network device establishes a messaging bus with a container networking plug-in associated with a container virtual network. At 484, the network device obtains, via the messaging bus, networking information for one or more containers hosted at the at least one container-hosting computing device. At 486, based on the networking information, the network device provides visibility of one or more containers below the network device (i.e., the provide visibility of the one or more of the containers at the at least one container-hosting computing device). The network device may also configure, at the network device, networking functionality for the one or more containers.

As noted above, presented herein are techniques in which a network device connected to one or more container-hosting computing devices can operate agnostic to any Container Orchestrator Engines (i.e., orchestrator agnostic container visibility. The techniques presented herein enable orchestrator agnostic container tracking as well as, in certain examples, auto-configuration of the network devices (e.g., switches) for container workloads, without requiring integration with any Container Orchestration Engines. The techniques presented herein enable: workload automation with container workloads (e.g., auto-configuration based on container create/delete events), consistent application-policy realization within the Fabric, seamless handling of workload move/respawn, bulk processing for TOR up/going events, support for blade-server deployments, etc.

In one form, a method at a network device connected to at least one container-hosting computing device is provided. The method comprises: establishing a messaging bus with a container networking plug-in associated with a container virtual network; obtaining, via the messaging bus, networking information for one or more containers hosted at the at least one container-hosting computing device; and based on the networking information, providing visibility of one or more containers below the network device.

In another form, a network device connected to at least one container-hosting computing device is provided. The network device comprises: a network interface; a memory; and a processor configured to: establish a messaging bus with a container networking plug-in associated with a container virtual network; obtain, via the messaging bus, networking information for one or more containers hosted at the at least one container-hosting computing device; and based on the networking information, provide visibility of one or more containers below the network device.

In another form, one or more non-transitory computer readable storage media at a network device connected to at least one container-hosting computing device are provided. The non-transitory computer readable storage media are encoded with instructions that, when executed by a processor, cause the processor to: establish a messaging bus with a container networking plug-in associated with a container virtual network; obtain, via the messaging bus, networking information for one or more containers hosted at the at least one container-hosting computing device; and based on the networking information, provide visibility of one or more containers below the network device.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method, comprising:
   at a network device connected to at least one container-hosting computing device:
   establishing a messaging bus with a container networking plug-in associated with a container virtual network;
   obtaining, via the messaging bus, networking information for one or more containers hosted at the at least one container-hosting computing device, and providing, by the network device, network connectivity to the one or more containers running behind the network device; and
   based on the networking information, providing visibility, to the network device, of the one or more containers at the at least one container-hosting computing device,
   wherein the container networking plug-in is configured to:
   operate with different networks and different orchestration functions, and is remote from the network device, and
   provide a same network view to at least two of the one or more containers regardless of an underlying network topology.

2. The method of claim 1, further comprising:
   discovering a respective port of the network device for the respective one or more containers;
   based on the networking information including the respective port of the network device for the one or more containers, configuring, at the network device, networking functionality for the one or more containers; and
   based on the networking information, provisioning, by the network device, one or more of network resources to provide the network connectivity to the one or more containers.

3. The method of claim 1, wherein establishing the messaging bus with the container networking plug-in associated with the container virtual network comprises:
   subscribing to container lifecycle notifications that are generated by the container networking plug-in in response to lifecycle events of the one or more containers hosted at the at least one container-hosting computing device.

4. The method of claim 3, further comprising:
discovering, at the network device, one or more of the at least one container-hosting computing device or the one or more containers.

5. The method of claim 4, wherein subscribing to container lifecycle notifications that are generated by the container networking plug-in comprises:
subscribing only to container lifecycle notifications that are related to the one or more of the at least one container-hosting computing device or the one or more containers discovered by the network device.

6. The method of claim 4, further comprising:
filtering container lifecycle notifications based on the one or more of the at least one container-hosting computing device or the one or more containers discovered by the network device.

7. The method of claim 1, further comprising:
dynamically triggering a configuration of one or more network policies on the network device in response to container information received via the messaging bus.

8. The method of claim 1, wherein the container networking plug-in comprises a container network manager configured to communicate with one or more orchestration functions and at least one container network agent executed at the at least one container-hosting computing device, and wherein establishing the messaging bus with the container networking plug-in comprises:
subscribing to container lifecycle notifications that are generated by the container network manager,
wherein the network device is agnostic to the one or more orchestration functions that are running the one or more containers.

9. The method of claim 1, wherein establishing the messaging bus with the container networking plug-in comprises:
subscribing to a container lifecycle notification generated by a central entity that acts as a resource manager of the container networking plug-in, the resource manager hiding orchestrator specifics from the network device.

10. A network device connected to at least one container-hosting computing device, comprising:
a network interface;
a memory; and
a processor configured to:
establish a messaging bus with a container networking plug-in associated with a container virtual network;
obtain, via the messaging bus, networking information for one or more containers hosted at the at least one container-hosting computing device, and provide, by the network device, network connectivity to the one or more containers running behind the network device; and
based on the networking information, provide visibility, to the network device, of the one or more containers at the at least one container-hosting computing device,
wherein the container networking plug-in is configured to:
operate with different networks and different orchestration functions, and is remote from the network device, and
provide a same network view to at least two of the one or more containers regardless of an underlying network topology.

11. The network device of claim 10, wherein the processor is configured to:
discover the one or more of the containers running behind the network device and a respective port of the network device for the respective one or more containers;
based on the networking information including the respective port of the network device for the one or more containers, configure, at the network device, networking functionality for the one or more containers; and
based on the networking information, provision one or more of network resources to provide the network connectivity to the one or more containers.

12. The network device of claim 10, wherein to establish the messaging bus with the container networking plug-in associated with the container virtual network, the processor is configured to:
subscribe to container lifecycle notifications that are generated by the container networking plug-in in response to lifecycle events of the one or more containers hosted at the at least one container-hosting computing device.

13. The network device of claim 12, wherein the processor is configured to:
discover one or more of the at least one container-hosting computing device or the one or more containers.

14. The network device of claim 13, wherein to subscribe to container lifecycle notifications that are generated by the container networking plug-in, the processor is configured to:
subscribe only to container lifecycle notifications that are related to the one or more of the at least one container-hosting computing device or the one or more containers discovered by the network device.

15. The network device of claim 13, wherein the processor is configured to:
filter container lifecycle notifications based on the one or more of the at least one container-hosting computing device or the one or more containers discovered by the network device.

16. One or more non-transitory computer readable storage media at a network device connected to at least one container-hosting computing device, wherein the-transitory computer readable storage media are encoded with instructions that, when executed by a processor, cause the processor to:
establish a messaging bus with a container networking plug-in associated with a container virtual network;
obtain, via the messaging bus, networking information for one or more containers hosted at the at least one container-hosting computing device, and provide, by the network device, network connectivity to the one or more containers running behind the network device; and
based on the networking information, provide visibility, to the network device, of the one or more containers at the at least one container-hosting computing device,
wherein the container networking plug-in is configured to:
operate with different networks and different orchestration functions, and is remote from the network device, and
provide a same network view to at least two of the one or more containers regardless of an underlying network topology.

17. The non-transitory computer readable storage media of claim 16, further comprising instructions operable to:
discover the one or more containers running behind the network device and a respective port of the network device for the respective one or more containers;
based on the networking information including the respective port of the network device for the one or more containers, configure, at the network device, networking functionality for the one or more containers; and based on the networking information, provision, at the network device, one or more of network resources to provide the network connectivity to the one or more containers.

18. The non-transitory computer readable storage media of claim 16, wherein the instructions operable to establish the messaging bus with the container networking plug-in associated with the container virtual network comprise instructions operable to:
  subscribe to container lifecycle notifications that are generated by the container networking plug-in in response to lifecycle events of the one or more containers hosted at the at least one container-hosting computing device.

19. The non-transitory computer readable storage media of claim 18, further comprising instructions operable to:
  discover, at the network device, one or more of the at least one container-hosting computing device or the one or more containers.

20. The non-transitory computer readable storage media of claim 19, wherein the instructions operable to subscribe to the container lifecycle notifications that are generated by the container networking plug-in comprise instructions operable to:
  subscribe to the container lifecycle notifications that are related to the one or more of the at least one container-hosting computing device or the one or more containers discovered by the network device.

\* \* \* \* \*